US008239202B2

(12) United States Patent
Hsiao

(10) Patent No.: US 8,239,202 B2
(45) Date of Patent: Aug. 7, 2012

(54) SYSTEM AND METHOD FOR AUDIBLY OUTPUTTING TEXT MESSAGES

(75) Inventor: Chi-Ming Hsiao, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 793 days.

(21) Appl. No.: 12/343,370

(22) Filed: Dec. 23, 2008

(65) Prior Publication Data
US 2009/0313022 A1 Dec. 17, 2009

(30) Foreign Application Priority Data
Jun. 12, 2008 (CN) .......................... 2008 1 0302115

(51) Int. Cl.
*G10L 13/08* (2006.01)
*G10L 13/00* (2006.01)

(52) U.S. Cl. .................. 704/260; 704/258; 704/200

(58) Field of Classification Search ............... 704/200; 379/88.16
See application file for complete search history.

(56) References Cited

U.S. PATENT DOCUMENTS

| | | | | |
|---|---|---|---|---|
| 4,153,877 | A * | 5/1979 | Fathauer et al. ............... | 455/76 |
| 6,098,041 | A * | 8/2000 | Matsumoto .................... | 704/260 |
| 6,181,956 | B1 * | 1/2001 | Koskan .......................... | 455/566 |
| 6,446,040 | B1 * | 9/2002 | Socher et al. .................. | 704/260 |
| 6,625,576 | B2 * | 9/2003 | Kochanski et al. ............ | 704/260 |
| 6,810,379 | B1 * | 10/2004 | Vermeulen et al. ............ | 704/260 |
| 7,043,436 | B1 * | 5/2006 | Ryu ............................... | 704/270.1 |
| 7,650,170 | B2 * | 1/2010 | May et al. ..................... | 455/569.2 |
| 2004/0093213 | A1 * | 5/2004 | Conkie ........................... | 704/258 |
| 2004/0107102 | A1 * | 6/2004 | Chung et al. .................. | 704/260 |
| 2005/0043951 | A1 * | 2/2005 | Schurter ........................ | 704/270.1 |
| 2006/0217981 | A1 * | 9/2006 | Mahmudovska et al. ..... | 704/260 |
| 2006/0277044 | A1 * | 12/2006 | McKay .......................... | 704/260 |
| 2007/0162284 | A1 * | 7/2007 | Otani ............................. | 704/260 |

OTHER PUBLICATIONS

MacMembrane. "Create a Text to Speech Shortcut in System Preferences". http://macmembrane.com/create-a-text-to-speech-shortcut-in-system-preferences/, published May 3, 2008.*
Elovitz et al. "Letter-to-Sound Rules for Automatic Translation of English Text to Phonetics". IEEE Transactions on Acoustics, Speech, and Signal Processing, vol. ASSP-24, No. 6, Dec. 1976.*
Section Two: Using the Read Out Loud Text-to-Speech Tool. Adobe Products Website www.adobe.com/enterprise/accessibility/reader6/sec2.html captured Aug. 18, 2005.*
Author: Zhihu Song, Hongcai Tao; title of the article: Design and Implementation of TTS Value-added Service in VOIP; title of the magazine: World Sci-Tech R&D; date: Dec. 2007; pp. 5.

* cited by examiner

*Primary Examiner* — Talivaldis Ivars Smits
*Assistant Examiner* — Jesse Pullias
(74) *Attorney, Agent, or Firm* — Altis Law Group, Inc.

(57) ABSTRACT

A method and system for audibly outputting text messages includes: setting a vocalizing function for audibly outputting text messages, searching a character speech library for each character of a received text message, and acquiring pronunciation data of each character of the received text message. The method and the system further includes vocalizing the pronunciation data of each character of the received text message, generating a voice message, and audibly outputting the generated voice message.

15 Claims, 3 Drawing Sheets

SYSTEM AND METHOD FOR AUDIBLY OUTPUTTING TEXT MESSAGES

BACKGROUND

1. Field of the Invention

Embodiments of the present disclosure relate to short message service (SMS) systems and methods, and more particularly to a system and method for audibly outputting text messages.

2. Description of Related Art

With rapid development of communication, portable electronic devices, such as mobile phones are now in widespread use. Now, mobile phones are the major means of communication in business, industry, government and social intercourse. Mobile phones provide various functionalities for people, such as short message services, communications, games, calendars, music, etc. More and more people utilize mobile phones to communicate with others, or transmit data through short messages. Smart phones generally have more advanced features than mobile phones and may be used to receive or send various kinds of short messages, such as text messages, voice messages, visual messages, and multimedia messaging service (MMS) messages, etc.

However, smart phones are generally more expensive than common mobile phones, which may not be able to receive or transmit voice messages, but only text messages. Thus, users of the common mobile phones may not be able to communicate with others by using voice messages. For example, visually impaired people may not be able to know the contents of a text message independently.

What is needed, therefore, is a system and method for overcoming the above-stated problems.

DETAILED DESCRIPTION OF CERTAIN INVENTIVE EMBODIMENTS

All of the processes described below may be embodied in, and fully automated via, functional code modules executed by one or more general purpose computers or processors. The code modules may be stored in any type of computer-readable medium or other storage device. Some or all of the methods may alternatively be embodied in specialized computer hardware or communication apparatus.

Figure 1:
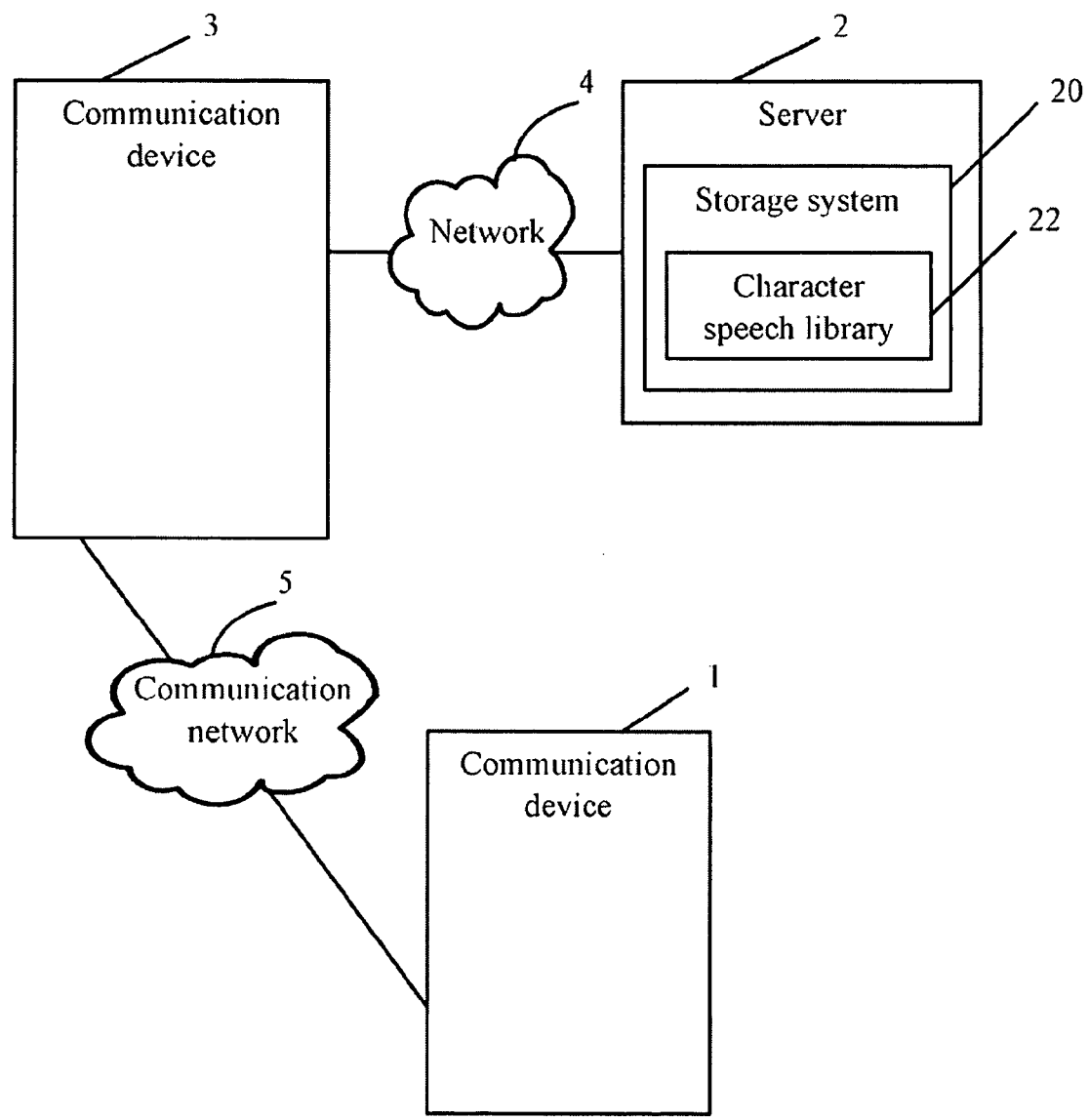
FIG. 1 is a block diagram of one embodiment of a system for outputting text messages of a communication device audibly.

FIG. 1 is a block diagram of one embodiment of a system for audibly outputting text messages (hereinafter referred to as "the playing system"). Depending on the embodiment of the present disclosure, the playing system may include a communication device 1, a server 2, and a communication device 3. The communication device 3 may communicate with the communication device 1 through a communication network 5. Depending on the embodiment, the communication network 5 may be the Global System for Mobile communication (GSM) network, the General Packet Radio Service (GPRS) network, or the Internet, for example. Depending on the embodiment, the communication device 1 and the communication device 3 may be mobile phones, personal digital assistants, or computing devices.

The communication device 3 may connect to the server 2 through a network 4. The network 4 may be an intranet, the Internet, or any other suitable type of communications link. In one embodiment, the network 4 may be the same network as the communication network 5. In one embodiment, the server 2 may be a host computer, and includes a storage system 20 for storing various data, such as a character speech library 22. The character speech library 22 stores sound/pronunciation data of different characters, such as Chinese characters, English characters, numbers, etc.

The communication device 1 may send a short message to the communication device 3 through the communication network 5, where the communication device 3 receives the short message and determines if the short message is a text message. Generally, short messages may include various types, such as text messages, voice messages, visual messages, multimedia messaging service (MMS) messages, etc. In the embodiment, the playing system is configured for transforming a text message into a voice message so as to output the text message audibly.

The communication device 3 may search the character speech library 22 for pronunciation data of each character of a text message, vocalize the pronunciation data of each character of the text message, and generate a voice message for outputting audibly.

Figure 2:
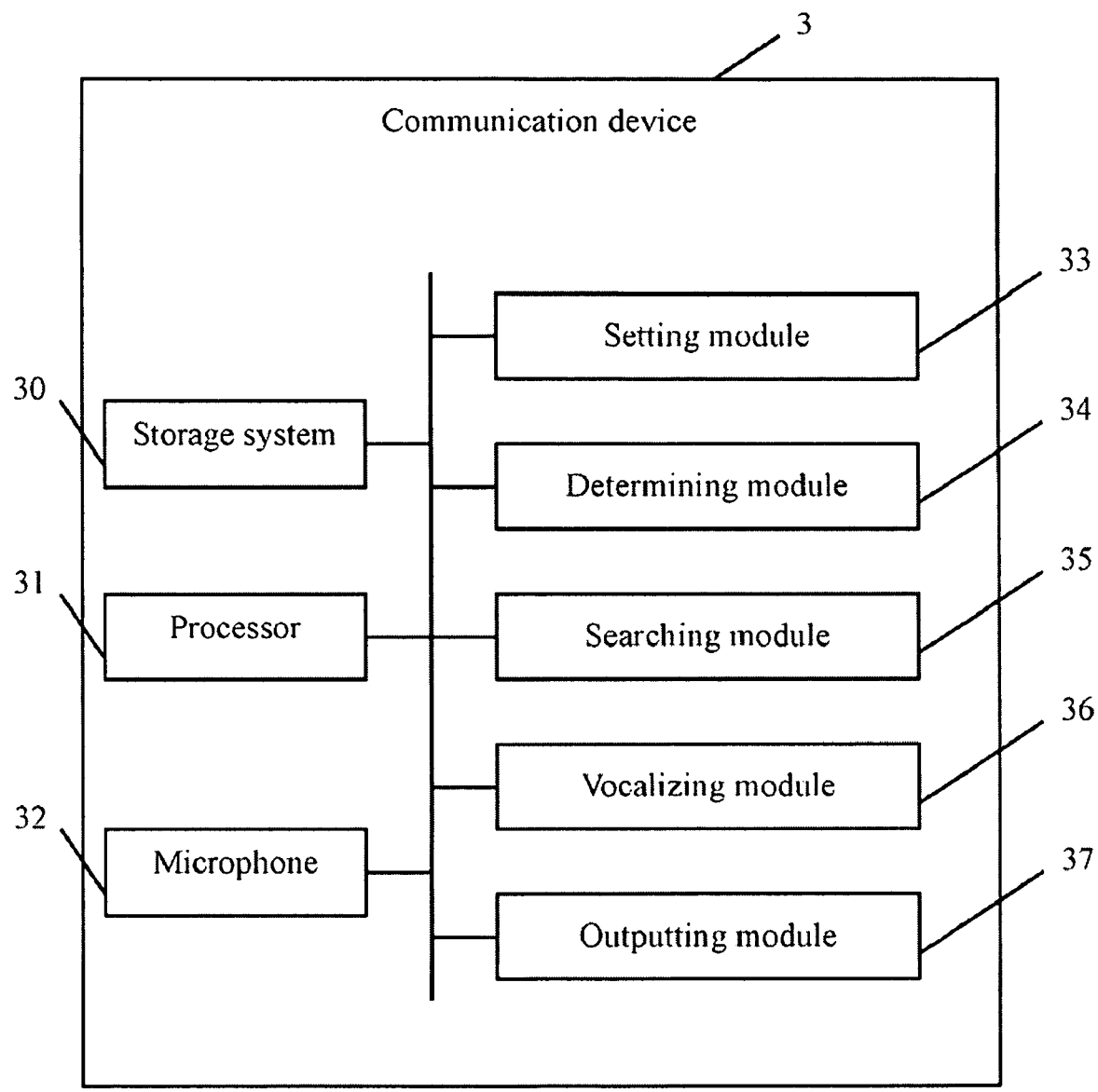
FIG. 2 is a block diagram of one embodiment of the communication device of FIG. 1.

FIG. 2 is a block diagram of one embodiment of the communication device 3. In one embodiment, the communication device 3 includes a storage system 30, at least one processor 31, and a microphone 32. The storage system 30 is used for storing various kinds of data, such as short messages, communication records, etc. Depending on the embodiment, the storage system 30 may include a memory of the communication device 3 or an external storing card, such as a memory stick, a Subscriber Identity Module (SIM) card, for example.

In one embodiment, the communication device 3 may include a setting module 33, a determining module 34, a searching module 35, a vocalizing module 36, and a outputting module 37. The modules 33, 34, 35, 36 and 37 may be used to perform one or more operations for the communication device 3. The at least one processor 31 may be used for executing at least one operation for the modules 33, 34, 35, 36 and 37.

The setting module 33 is configured for setting a vocalizing function for audibly outputting text messages, and setting hotkeys or shortcuts to invoke or terminate the vocalizing function.

The determining module 34 is configured for determining if the communication device 3 receives a text message from the communication device 1.

The searching module 35 is configured for searching the character speech library 22 for each character of the received text message if the communication device 3 receives the text message from the communication device 1, and acquiring pronunciation data of each character of the received text message.

The vocalizing module 36 is configured for vocalizing the pronunciation data of each character of the received text message, and generating a voice message.

The outputting module 37 is configured for audibly outputting the generated voice message by using an output device of the communication device 3, such as the microphone 32. In other embodiments, the outputting module 37 may output the generated voice message through a headset (not shown in FIG. 2) or any kind of audio playing device. The outputting module 37 is further configured for playing/audibly outputting voice messages received by the communication device 3 through the communication network 5.

In one embodiment, a user of the communication device 3 may input a text message through the communication device 3 first, and then the communication device 3 generates a corresponding voice message of the input text message, and audibly output the generated voice message.

Figure 3:
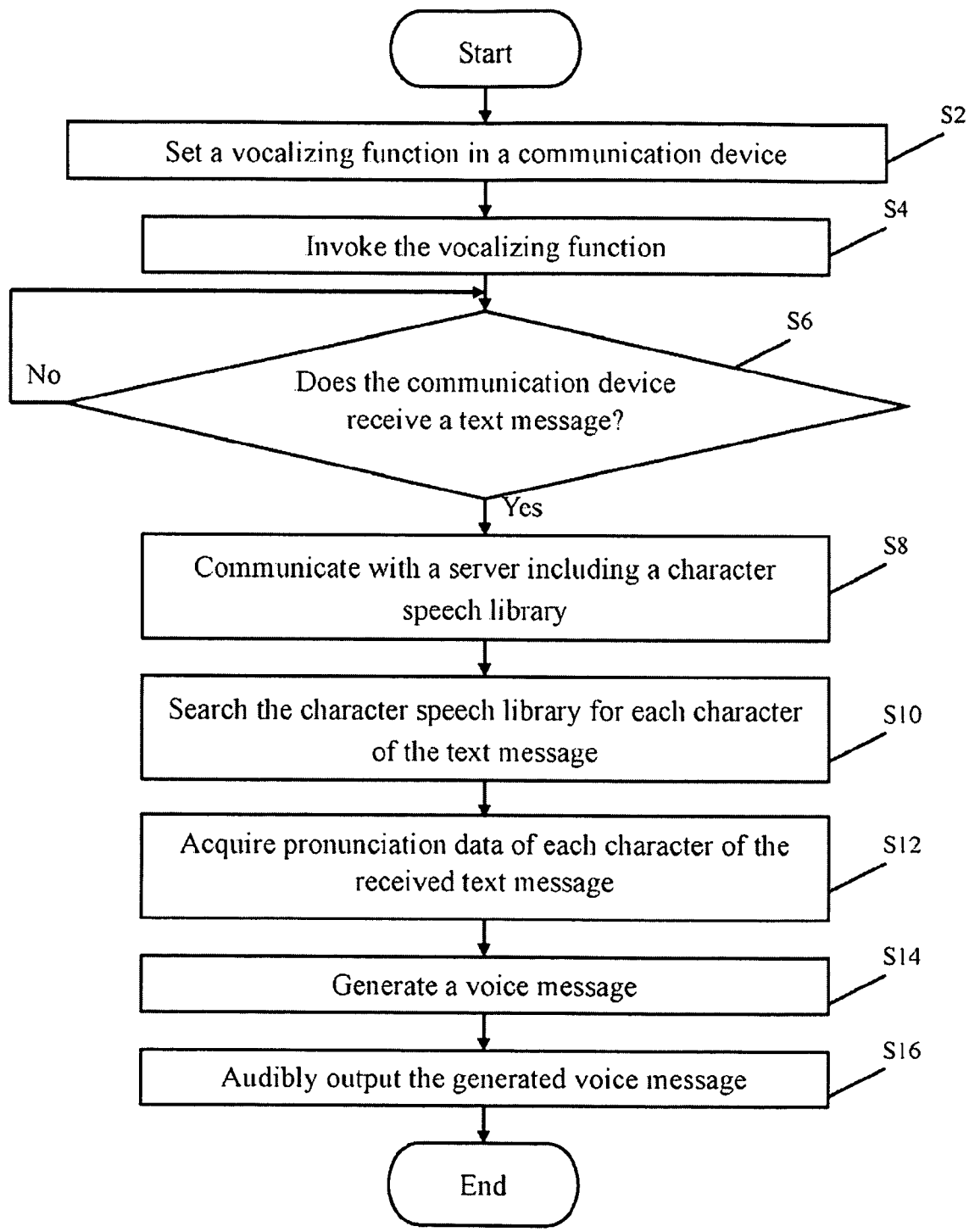
FIG. 3 is a flowchart of one embodiment of a method for audibly outputting text messages.

FIG. 3 is a flowchart of one embodiment of a method for audibly outputting text messages. Depending on the embodiment, additional blocks may be added, others removed, and the ordering of the blocks may be replaced.

In block S2, the setting module 33 sets a vocalizing function for audibly outputting text messages, and sets hotkeys or shortcuts to invoke or terminate the vocalizing function. The setting module 33 may add the vocalizing function in a function menu of the communication device 3. The vocalizing function may be invoked or terminated through the function menu or the hotkeys, such as a hotkey "#" for invoking the vocalizing function, and a hotkey "0" for terminating the vocalizing function.

In block S4, the vocalizing function is invoked in response to a signal corresponding actuation of the hotkey.

In block S6, the determining module 34 determines if the communication device 3 receives a text message from the communication device 1. If the communication device 3 receives a text message from the communication device 1, in block S8, the communication device 3 communicates with the server 2, which includes the character speech library 22. If the communication device 3 does not receive a text message from the communication device 1, the procedure returns to block S6.

In block S10, the searching module 35 searches for pronunciation data of each character of the received text message from the character speech library 22. In block S12, the searching module 35 acquires the pronunciation data of each character of the received text message from the character speech library 22.

In block S14, the vocalizing module 36 vocalizes the pronunciation data of each character of the received text message, and generates a voice message.

In block S16, the outputting module 37 audibly outputs the generated voice message by using an output device of the communication device 3, such as the microphone 32.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A communication device for audibly outputting text messages, the communication device in communication with a server over a communication network, the server providing a character speech library, the communication device comprising:

a setting module configured for setting a vocalizing function for audibly outputting text messages, and setting separate shortcuts in a function menu of the communication device to respectively invoke and terminate the vocalizing function;

a searching module configured for individually searching the character speech library for each character of a text message received by the communication device over the communication network, before acquiring pronunciation data of each character of the received text message;

a vocalizing module configured for vocalizing the pronunciation data of each character of the received text message to generate a voice message;

a outputting module configured for audibly outputting the generated voice message by using a microphone; and at least one processor that executes the setting module, the searching module, the vocalizing module, and the outputting module.

2. The communication device according to claim 1, wherein the setting module is further configured for setting hotkeys to invoke or terminate the vocalizing function.

3. The communication device according to claim 1, wherein the character speech library comprises Chinese characters, letters, symbols, and/or numbers.

4. The communication device according to claim 1, wherein the outputting module is further configured for audibly outputting voice messages received over the communication network.

5. The communication device according to claim 1, wherein the generated voice message is outputted through a microphone of the communication device.

6. A method for audibly outputting text messages of a communication device, the communication device in communication with a server over a communication network, the server providing a character speech library, the method comprising:

setting a vocalizing function for audibly outputting text messages and setting separate shortcuts in a function menu of the communication device to respectively invoke and terminate the vocalizing function;

receiving a text message by the communication device over the communication network;

individually searching the character speech library for each character of the received text message before acquiring pronunciation data of each character of the received text message;

vocalizing the pronunciation data of each character of the received text message to generate a voice message; and audibly outputting the generated voice message by using a microphone.

7. The method according to claim 6, further comprising: setting hotkeys to invoke or terminate the vocalizing function.

8. The method according to claim 6, further comprising: receiving a voice message over the communication network; and audibly outputting the received voice message.

9. The method according to claim 6, wherein the character speech library comprises Chinese characters, letters, symbols, and/or numbers.

10. The method according to claim 6, wherein the generated voice message is outputted through a microphone of the communication device.

11. A non-transitory storage medium having stored thereon instructions that, when executed by a processor, cause the processor to perform a method for audibly outputting text messages of a communication device, the communication device in communication with a server over a communication network, the server providing a character speech library, the method comprising:

setting a vocalizing function for audibly outputting text messages and setting separate shortcuts in a function menu of the communication device to respectively invoke and terminate the vocalizing function;

receiving a text message by the communication device over the communication network;

individually searching the character speech library for each character of the received text message before acquiring pronunciation data of each character of the received text message;

vocalizing the pronunciation data of each character of the received text message to generate a voice message; and audibly outputting the generated voice message by using a microphone.

12. The medium according to claim 11, wherein the method further comprises:

setting hotkeys to invoke or terminate the vocalizing function.

13. The medium according to claim 11, wherein the method further comprises:

receiving a voice message over the communication network; and audibly outputting the received voice message.

14. The medium according to claim 11, wherein the character speech library comprises Chinese characters, letters, symbols, and/or numbers.

15. The medium according to claim 11, wherein the generated voice message is outputted through a microphone of the communication device.

* * * * *